United States Patent [19]

Rozmus

[11] 4,099,043

[45] Jul. 4, 1978

[54] PROGRESSIVE DIE WELDING OF ELECTRICAL CONTACTS

[76] Inventor: John J. Rozmus, 1030 Derwydd La., Berwyn, Pa. 19312

[21] Appl. No.: 753,923

[22] Filed: Dec. 23, 1976

[51] Int. Cl.² .................................................. B23K 9/12

[52] U.S. Cl. .................................. 219/78.16; 228/6 A; 29/630 C; 219/85 CA; 219/87; 219/150 R; 219/86.31

[58] Field of Search ................. 29/630 C; 219/78, 79, 219/85 CA, 85 R, 86, 87, 89, 103, 107, 118, 119, 120, 149, 150 R, 152, 154; 228/6 A, 13, 44.1 A

[56] References Cited

U.S. PATENT DOCUMENTS

| | | | |
|---|---|---|---|
| 3,354,290 | 11/1967 | Monroe et al. | 219/120 X |
| 3,509,307 | 4/1970 | Gannoe | 219/103 X |
| 3,575,570 | 4/1971 | Gellatly et al. | 219/78 X |
| 3,585,346 | 6/1971 | Jackson | 219/79 X |
| 3,671,708 | 6/1972 | Moravsky et al. | 219/78 |
| 3,990,864 | 11/1976 | Rozmus | 29/630 C |
| 3,992,762 | 11/1976 | Gleizes | 219/103 X |

FOREIGN PATENT DOCUMENTS

| | | | |
|---|---|---|---|
| 1,179,722 | 1/1970 | United Kingdom | 219/86 |

*Primary Examiner*—J. V. Truhe
*Assistant Examiner*—Mark H. Paschall
*Attorney, Agent, or Firm*—Frederick J. Olsson

[57] ABSTRACT

Electrodes are incorporated in a progressive die to weld precious metal to spring contact body being formed by the die. One electrode is carried by the die bolster and the other electrode is carried by a pivotally mounted narrow arm projecting into the die. The arm is moved into welding position when engaged by a narrow, leaf spring carried by the punch pad bolster and also projecting into the die.

7 Claims, 10 Drawing Figures

PROGRESSIVE DIE WELDING OF ELECTRICAL CONTACTS

This invention relates to electrical contacts and in particular relates to welding mechanism incorporated in a progressive die which forms the contacts.

The type of contacts referred to and methods for forming the same in a progressive die are shown in my U.S. Pat. No. 3,990,864.

Such contacts comprise an elongated body and a contact element mechanically captured in a slot in the body so that the element makes an electrical connection with the body. The contact element has a precious metal surface for establishing an electrical connection with a mating connector.

Contacts of the kind in question are sometimes employed in atmospheres where corrosive action might, over a period of time, cause undersirable affects in the electrical bond between the body and the contact element.

To assure long term reliability of the electrical bond in hostile, unpredictable atmospheres the contact element can be welded to the body. The welded area joining the element and body has no interface and thus the electrical path is uneffected by the atmosphere.

For purposes of attaining the desired atmospheric reliability be welding, the invention contemplates performing the welding operation in a progressive die so that the welding takes place at the same time the punch and die means are stamping the contact.

According to the invention a welder is structured to fit into the progressive die and actuated by the down motion of the punch pad bolster so that the electrodes engage the base and body at the same time the punch and die means engage the strips. In this way the stamping and welding occurs simultaneously within a single machine and a completely formed and welded contact is discharged with each stroke.

The welder of the invention is structured and located to provide the option of both welding and mechanical capture or either one alone.

As compared to prior methods of welding precious metal contact material, the invention has significant advantages from the standpoint of cost savings in machines, fixtures, tooling, handling, labor, installation and power.

A preferred embodiment of the invention will be explained below in connection with the following drawings wherein.

Figure 1:
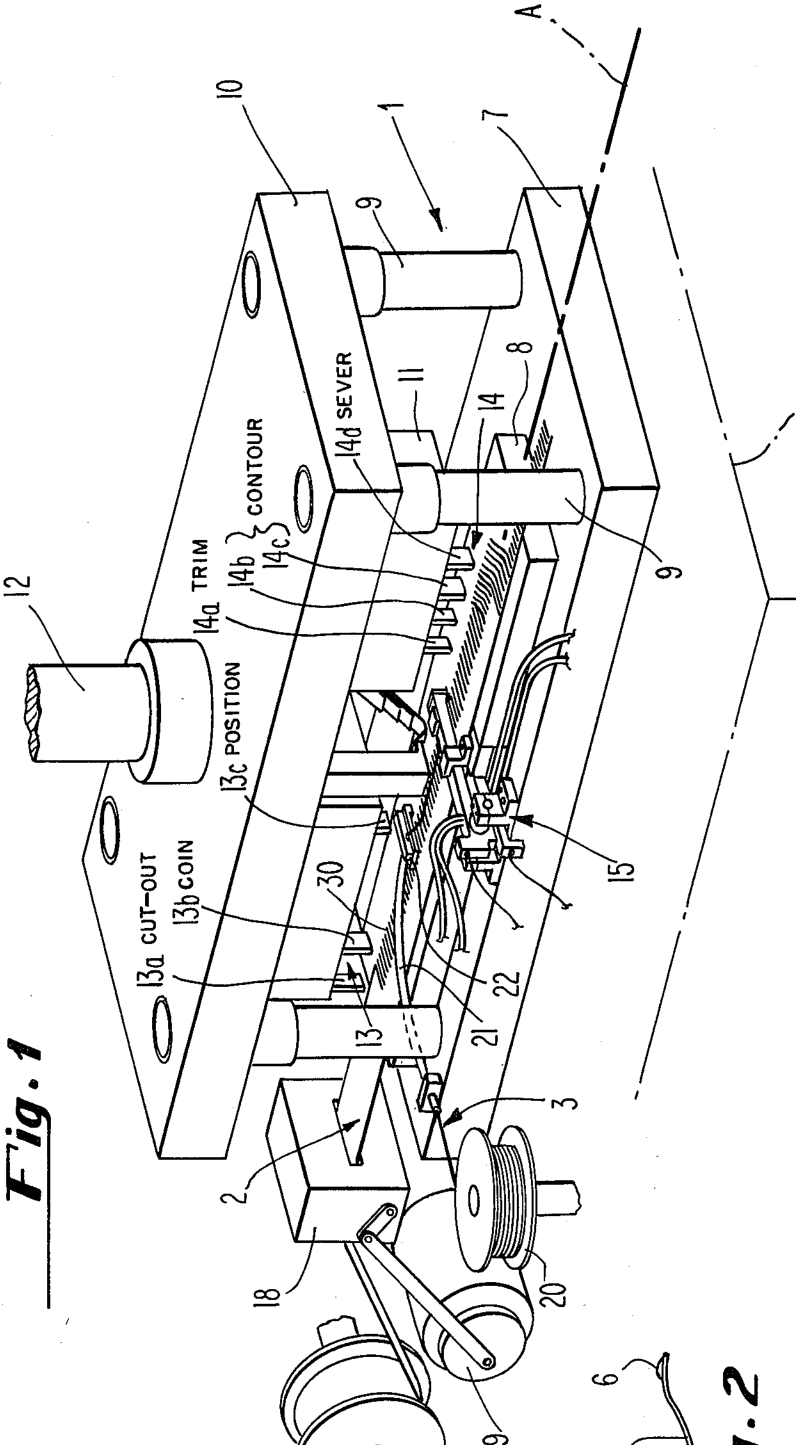
FIG. 1 is a diagramatic, perspective view of a progressive die incorporating the invention.

In FIG. 1 I have shown a portion of a press or stamping machine M incorporating a progressive die 1. A body strip 2 and a surface strip 3 are intermittently moved (left to right) thru the die along the axis A where they are stamped and welded into electrical contacts. Typical of such contacts is the contact 4 diagramatically illustrated in FIG. 2 which comprises a contact body 5 and a contact element 6 welded to the body. The element 6 has a precious metal surface. The contact 4 is similar to the contacts shown in my U.S. Pat. No. 3,990,864.

The progressive die has the die bolster 7 which is fixedly mounted on the press and carries a die pad 8. Guide pins 9 extending up from the die bolster carry the punch pad bolster 10 mounting the punch pad 11. The punch pad bolster 10 is adapted to be moved on the pins 9 toward and away from die pad bolster 7 as by the drive means noted at 12.

The punch pad 11 carries a first group of punches 13 and a second group of punches 14. The die pad 8 carries corresponding dies which for the sake of clarity I have not shown. The welding mechanism 15 of the invention is mounted in the die between the two groups of punches.

The respective mating punches and dies are spaced at stations along the axis A. A stripper plate mechanism is needed in dies of this kind have been omitted for purposes of clarity. The stripper plate guides the strips 2 and 3 along the axis A and maintains the strips against lateral movement.

The body strip 2 is mounted on a roll 17 and pulled off the roll and intermittently fed along the axis A by the feeder 18 operated by the motor-eccentric mechanism 19.

The intermittent motion of the feeder 18 is coordinated with the reciprocating motion of the press drive 12 so that the punch pad bolster moves down and the punches contact the strips and the welder 15 actuated during the dwell period of the body strip.

The surface strip 3 is mounted on the roll 20 and is conducted into position by a guide tube 21 which directs the strip into a funnel mechanism 22 mounted over the body strip 2. The surface strip 3 is welded to the body strip 2 by the mechanism 15 and will be pulled thru the die by the strip motion thereafter.

With the exception of the welding mechanism 15 the above mentioned parts are similar to the corresponding parts shown in my U.S. Pat. No. 3,990,864 with the principal changes as following. The die pad 8 is split into two parts so that the welding mechanism 15 can be sandwiched between the same and the punch pad 11 is modified to also accommodate welding mechanism to appropriately vertically position the various punches.

Figure 3:
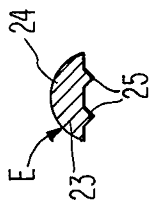
FIG. 3 is a sectional view illustrating a typical cross section of a surface strip.

A typical body strip of the kind mentioned has a rectangular cross section and is approximately 1-2 inches wide and 0.048 inches thick and made of a copper alloy which provides the spring or resilient characteristic. A typical surface strip has a cross section shown in FIG. 3 and comprises a base 23 and a top contoured contact surface 24 which has an integral film of precious metal which is perferrably gold. The approximate width and height of the strip are respectively 0.008 inch and 0.035 inch. For welding purposes, the base is provided with a pair of tips 25.

The welding mechanism 15 can be employed for welding the surface strip 3 on the surface of the body strip 2 or in a slot in the body strip. For example, in FIG. 4 a section of the body strip carries on its top surface 26 a section of the surface strip 3 in position to be welded on the same. In FIG. 5 a section of the body strip includes a slot 27 which carries a section of the surface strip 3 in position to be welded. In applications employing a slot, the welded element may further mechanically captured in accordance with the method of my above mentioned patent.

Figure 4:
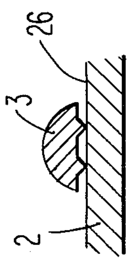
FIG. 4 is a sectional view illustrating a surface strip in position to be welded on the surface of a body strip.
Figure 5:
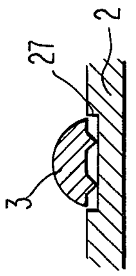
FIG. 5 is a sectional view illustrating a surface strip in position to be welded in a slot on a body strip.

The die shown in FIG. 1 is set up so that the surface strip is welded directly on the surface of the body strip as illustrated in FIG. 4. The operation of the die to stamp the contacts is described below. Since the operation of the punches and dies is similar to the corresponding elements in my U.S. Pat. No. 3,990,864 reference may be had to the specification of the patent for details.

In the first group 13, the punches 13*a*, 13*b*, and 13*c* correspond to the punches 16*a*, and 16*b* of my U.S. Pat. No. 3,990,864.

The punch 13*a* works the body strip 2 to make a pair of cut-outs which forms an elongated contact body. The punch 13*b* coins or flattens the body. This produces bodies 30 in the body strip which corresponds to the body 32 shown in FIG. 4(*c*) of said patent except that the body is without a slot. As previously indicated, if the contact element is to be welded in a slot the punch 13*b* is appropriately modified or an additional punch provided and this may be with or without capture projections as noted in said patent. The coining operation widens the body and the excess is trimmed off in a later operation so the contact is the desired width.

The funnel 22 feeds the surface strip 3 over the body strip and above contact bodies 30 at the appropriate position for welding. The punch 13*c* contacts the surface strip 3 and insures that the same is firmly down against the body strip or contact bodies in preparation for welding.

The surface strip 3 is welded by the mechanism 15 on the body strip or on a contact body with each dwell of the strips as the same progress along the axis A thru the die.

In the second group the punches 14*a*, 14*b*, 14*c*, and 14*d* correspond to the punches 16*f*, 16*g*, 16*i* of said patent.

The punch 14*a* performs a triming operation on the contact body and welded element to obtain the desired width, the punches 14*b* and 14*c* perform the contouring operation and the punch 14*d* severs the contact body and the welded element from the body strip.

While I have shown only minimum number of punches for the above operations, it will be understood that more than one punch may be employed for any operation depending upon physical characteristics and dimensions of the material, the degree of refinement and the like.

When the contact element is to be welded and mechanically captured in a slot, additional punches are provided for this purpose as noted in said patent.

Whether the surface strip is welded on the surface of the body strip or in a slot in the body strip depends largely on the type of application for the contacts.

As noted above the punch pad bolster is moved down so that the punches hit the strips during the dwell period or when the strips have stopped moving. The strip feed along the axis A occurs after the punches leave the stripper plate on the return stroke but before the next down stroke of the punch pad bolster.

The actual physical structure of the punch tips and corresponding dies is not shown as this will be readily apparent to those skilled in the art particularly when appraised of the type of operation and the results desired.

While I have illustrated the welding mechanism 15 disposed between punches, the invention contemplates that welder be disposed to lead the punches and perform the welding operation, prior to stamping. For example, the welder may be located in position occupied by the punches 13*a*, and 13*b* with the latter being moved to the right along the axis. In this case the funnel 22 is moved to lead the welder. The location of the other punches is adjusted accordingly. With this arrangement, the surface strip is welded at serially arranged spots which are then subsequently worked by the punches and dies.

It will be apparent from the description of the welding mechanism 15 below, that the change in axial position of the welding mechanism does not disturb its ability to be actuated by operation of the punch pad bolster.

Referring now to FIGS. 6 thru 10 details of the welding mechanism 15 will be explained.

The electrode arm 40 is fixedly mounted on the die bolster 10 and carries the electrode 41 which is disposed to engage the underside of the body strip or a contact body. The electrode arm 42 is moveably mounted on the die bolster and carries the electrode 43 which is adapted to engage the top of the surface strip for the welding operation. In the embodiment show, the arms 40 and 42 are conductors.

The arms 40 and 42 are both relatively narrow, rectangular in shape and project or extend into the die between the bolsters 7 and 10 are oriented generally 90° to the strips or the axis.

The arm 40 is mounted on the die bolster as follows. An insulating block 44 is carried by the bolster 10. The arm 40 had a cut-out section 45 (see FIG. 8). Insulated clamp 46 is mounted on the block 44 and has bridge section 46 which fits into the cut-out 45. The block 44 and clamp 46 are held down on the die bolster 7 as by the screws 48. In the position shown the clamp 46 fixedly secures the arm 40 and the electrode 41 on the die bolster 7 and insulates the same from the bolster. The outboard end of the arm 40 carries an electrical connector 49.

The welding operation developes considerable heat and for dissipating the same the arm 40 is provided with cooling means. This takes the form of duct 51 which is formed by milling a slot in the arm and covering the same the cap 52 (see FIG. 10). The fluid connectors 53 provide for the entrance and exit of fluid. Preferably this is a forced flow from a pump and fluid coller not shown.

The arm 42 is mounted on the die bolster as explained following. An insulated block 53 is fastened to bolster 7 by screws 53*a* and (see FIG. 10) has a pair of posts 54 and 55 which carry a pivot rod 56 held on the posts by caps 57 and 58. The rod carries a spacer 60 and insulated bushing 61. The bushing extends thru a bearing aperture 62 in the arm 42 and rotatably mounts the arm on the block 53 or bolster 7 so that electrode 43 is capable of reciprocating motion toward and away from the contact 41.

Figure 6:
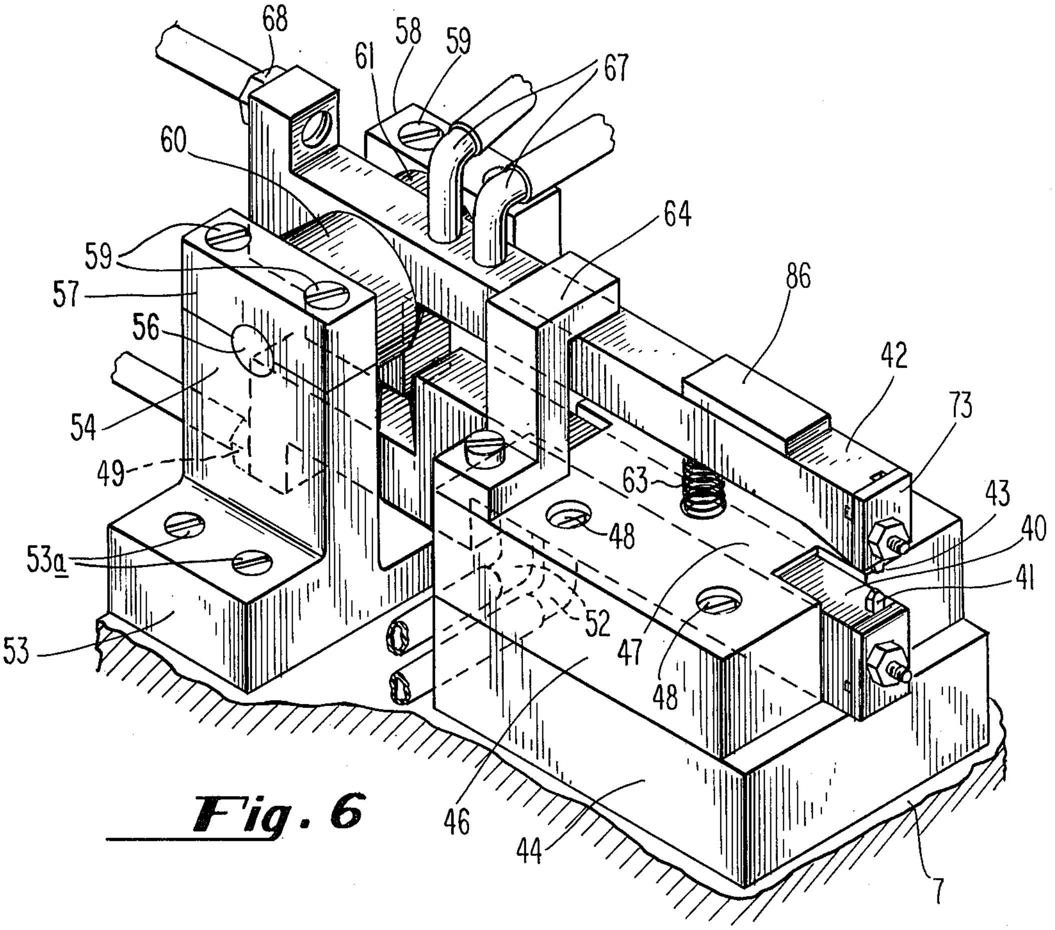
FIG. 6 is a perspective view illustrating the welding electrodes and supporting means for same.
Figure 8:
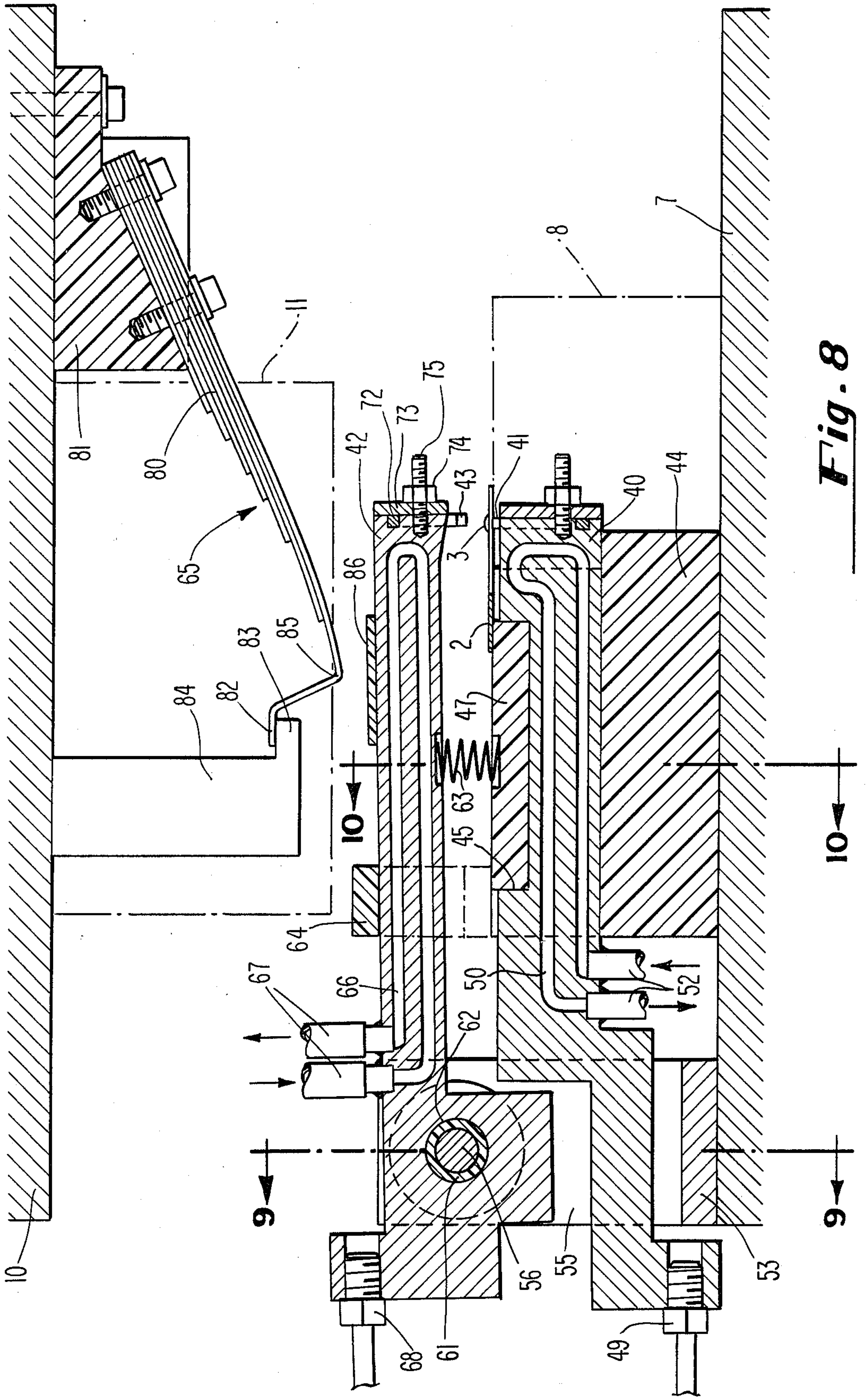
FIG. 8 is a elevational view partially in section illustrating the welding mechanism and how the same is incorporated in a progressive die.
Figure 9:
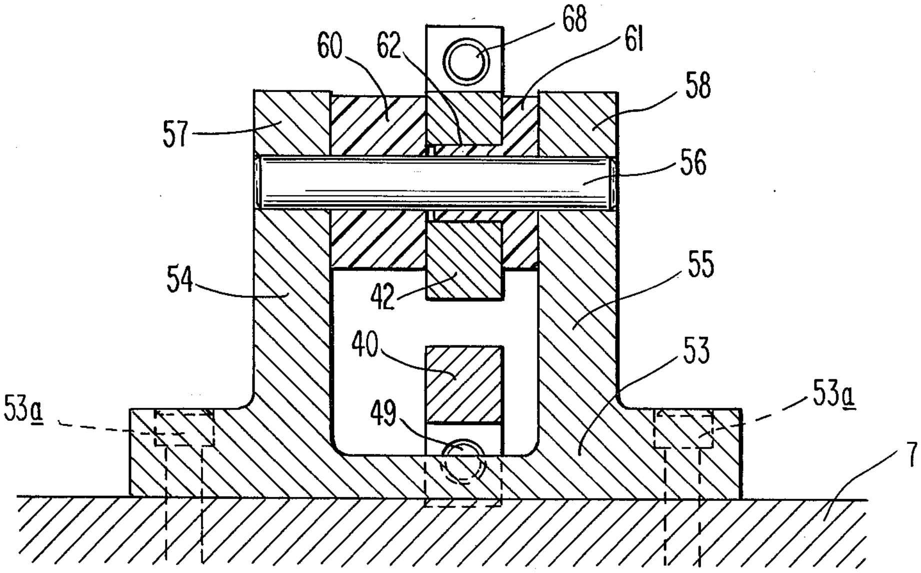
FIG. 9 is a view partially in section taken along the lines 9—9 of FIG. 8.
Figure 10:
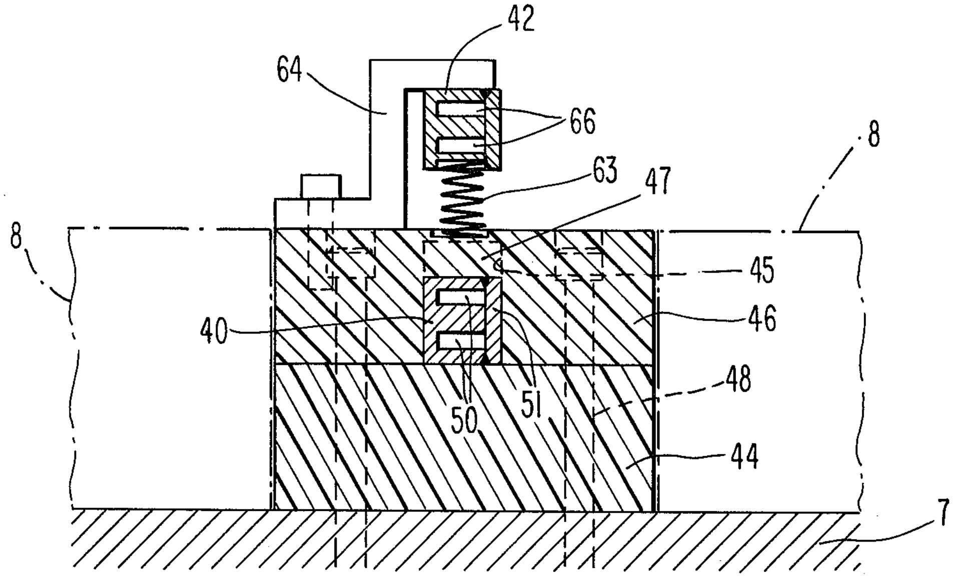
FIG. 10 is a view partially in section taken along the lines 10—10 of FIG. 8.

A spring 63 urges the arm 42 upwardly or so that the electrode 43 moves in a direction away from the electrode 41. The spring is held in sockets in the clamp 46 and in the bottom of the arm 43. The stop 64 mounted on the clamp 46 (also made of insulating material) limits the upward motion of the arm 43. As shown in FIGS. 6 and 8, the arm 42 is in position to be engaged by the actuater 65 on the punch pad bolster to move the electrode 43 down into welding engagement with the surface strip.

The arm 42 has a cooling duct 66 which is constructed in the same way as the duct 51 of arm 40 and fluid connectors connect the duct to the cooler and pump. The outer end of the arm 42 carries the electrical connector 68.

Figure 7:
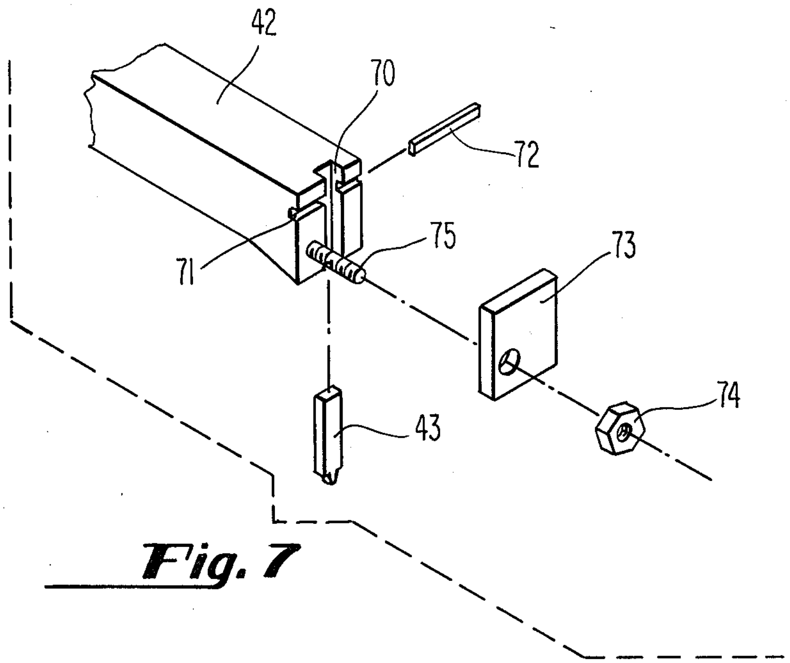
FIG. 7 is an exploded view showing the manner of mounting the electrodes.

The electrodes 41 and 43 are held on the respective arms by identical structure this will be explained in connection with the electrode 43 and arm 42, as shown in FIG. 7.

The inner end of the arm 42 has a vertical slot 70 and a crossed horizontal slot 71. The stop pin 72 snugly fits into the slot 71. The electrode 43 fits into the slot 70 and the upper end of the electrode engages the stop pin. A clamp plate 73 engages the electrode 43 and firmly holds the same in the slot 70. The clamp plate is held in position by the nut 74 tightened on the stud 75 threaded in the arm 42.

The above type arrangement provides good electrical contact between the electrode 43 and the arm 42. It also provides for quick change of electrodes when this operation is necessary.

The actuater mechanism 65 for arm 42 will next be described.

The actuater 65 includes a multi-leaf spring 80 one end of which is fastened to the punch pad bolster 10 by the block 81 and the other end of which is held by the lip 82 engaging the flange 83 on the block 84. The blocks 81 and 84 are made of insulating material.

The foregoing parts are dimensioned so that when the spring 80 is in the position of FIG. 8 the leaves are rotated or bent clockwise from the normal unsprung condition so that the spring is preloaded.

The spring is contoured as indicated at 85. This forms an abutment which is adapted to engage a plate 86 fastened to the upper arm 42. The plate is made of wear resistant, insulating material such as nylon.

At the dwell of the strips, the punch pad bolster 10 moves down and carries the actuator with it. The abutment 85 on the spring 80 engages the plate 86 on the arm 42 and pushes the arm and contact 43 downwardly. When the bolster completes its full downward motion the lip 82 has backed away from the flange 83 and the spring exerts considerable force (in the order of 15 lbs.). The strip 2 and 3 are tightly pressed between the electrodes 41 and 43. At this point a switch (not shown) is actuated by the punch pad bolster to allow welding current to pass between electrodes via the strips. The duration of the welding current is timed between ½ - 2 cycles. As the points 25 melt, the spring force compensates by moving the surface strip so that it continues in tight engagement with the body strip. The spring exerts force for a fractional period necessary to give the metal an opportunity to solidify before the pressure is relieved by the punch pad bolster moving upwardly for the return stroke.

When the punch pad bolster 10 moves upwardly the leaf spring 80 is carried up with it and the spring 63 causes the arm 42 to move up with the spring 80 until the arm reaches the stop position of FIG. 8.

Since the punches move down with the punch pad bolster to work the strip 2 and 3 and the welder 15 is actuated by the down motion of the bolster as described, it will be self evident that the welding and stamping operations take place simultaneously.

Figure 2:
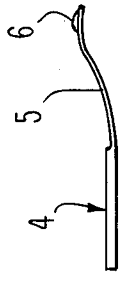
FIG. 2 is a diagramatic view illustrating a typical spring contact.

Before closing it is pointed out that the type of contact shown in FIG. 2 is given by way of example. The invention is applicable for contacts of various sizes and shapes.

I claim:

1. In a progressive die having a fixed die bolster and a reciprocating punch pad bolster for making electrical spring contacts by moving a body strip and a surface strip engaged therewith along an axis and working the same with punch and die means respectively mounted on the bolsters and the punch pad bolster being mounted to move in a working stroke from a return position toward the die bolster and in a return stroke away from the die bolster to the return position, welding mechanism operable simultaneously with the operation of the punch and die means for welding the surface strip to the body strip comprising:

first and second welding electrodes;

a first elongated, narrow arm extending between the bolsters in a direction transverse said axis and positioning said first electrode along said axis and fixedly mounting the first electrode on the die bolster, the first arm being a conductor to carry current for the first electrode and having duct means for circulating cooling fluid;

a second elongated, narrow arm extending between the bolsters in a direction transverse said axis and mounting said second electrode above said first electrode, the second arm being a conductor to carry current for the second electrode and having duct means for circulating cooling fluid;

mounting means connecting the second arm to the die bolster and mounting the arm for limited reciprocating motion whereby to move the second electrode toward and away from the first electrode;

an elongated, narrow, leaf spring extending between the bolsters above the second arm and in a direction transverse said axis, the spring having abutment means and one end of the spring having a lip;

first mechanism connected to said punch pad bolster and to said leaf spring and fixedly connecting the opposite end of the leaf spring to the punch pad bolster;

second mechanism connected to the punch pad bolster and including a flange engaging the underside of said lip, the engagement permitting the lip and flange to move relatively away from one another generally in the direction of movement of said punch pad bolster and the flange being positioned so that when it is engaged with the lip it maintains the lip with respect to the fixed end of the spring so that the spring is preloaded;

said first and second mechanisms providing for the leaf spring and its abutment means to reciprocate with the punch pad bolster;

said abutment means being positioned to move said arm and second electrode toward the first electrode with movement of the punch pad bolster in the working stroke whereby the second electrode engages the top of said surface strip and under such condition said engagement of the lip and flange providing for the flange to continue down with the punch pad bolster in the working stroke so the lip and flange move apart whereby to permit the spring to develop force to press the strips between the electrodes and maintain engagement thereof for the welding operation; and said means mounting the second arm being operative, when the punch pad bolster is in the return position, to yieldably maintain the second arm in a position wherein said second electrode is spaced away from said first electrode.

2. In a progressive die for making electrical spring contacts;

a punch pad bolster mounting a punch pad and a fixed die bolster mounting a die pad, the punch pad bolster being mounted to move in a working stroke from a return position toward the die bolster and in a return stroke away from the die bolster to the return position;

means for mounting a body strip and means for mounting a surface strip having a contact surface of precious metal for intermittent movement along an axis between the bolsters;

first punch and die means respectively mounted on said punch and die pads to work said body strip and form an elongated contact body and to position said surface strip on the contact body for a welding operation;

first and second electrodes for welding said surface strip to the contact body;

means positioning said first electrode along said axis and spaced from said first punch and die means to engage the underside of said contact body and fixedly mounting the first electrode on said die bolster and including conductor means to carry current for the first electrode and duct means for circulating cooling fluid;

an elongated narrow arm extending between the bolsters in a direction transverse said axis and mounting said second electrode above said first electrode, the arm being a conductor to carry current for the second electrode and having duct means for circulating cooling fluid;

mounting means connecting said arm to the die bolster and mounting the arm for limited reciprocating motion for moving the second electrode toward and away from the first electrode;

an elongated, narrow, leaf spring extending between the bolsters above said arm and in a direction transverse said axis, the spring having abutment means and one end of the spring having a lip;

first mechanism connected to said punch pad bolster and to said leaf spring and fixedly connecting the opposite end of the leaf spring to said punch pad bolster;

second mechanism connected to the punch pad bolster and including a flange engaging the underside of said lip, the engagement permitting the lip and flange to move relatively away from one another generally in the direction of movement of said punch pad bolster and the flange being positioned so that when it is engaged with the lip it maintains the lip with respect to the fixed end of the spring so that the spring is pre-loaded;

said first and second mechanisms providing for the leaf spring and its abutment means to reciprocate with the punch pad bolster;

said abutment means being positioned to move said arm and second electrode toward the first electrode with movement of the punch pad bolster in the working stroke wherby the second electrode engages the top of said surface strip and under such conditons said engagement of the lip and flange providing for the flange to continue down with the punch pad bolster in the working stroke so the lip and flange move apart whereby to permit the spring to develop force to press the surface strip and contact body between the electrodes and maintain the engagemeent thereof for the welding operation;

said means mounting said arm being operative, when the punch pad bolster is in the return positon, to yieldably maintain said arm in a position wherein said second electrode is spaced away from said first electrode; second punch and die means spaced from said electrodes along said axis to trim off surface strip material extending outwardly of the contact body and to sever the contact body and welded section of the surface strip from the body strip; and said engagement of the second electrode with said strip occurring simultaneously with the operation of said first and second punch and die means so that there is simultaneous occurrence of the welding and the stamping of punch and die means.

3. In a progressive die for making electrical spring contacts;

a punch pad bolster mounting a punch pad having a plurality of punch means and a die bolster mounting a die pad having a plurality of die means respectively spaced at stations along an axis, the punch pad bolster being mounted to move in a working stroke from a return position toward the die bolster and in a return stroke away from the die bolster to the return position;

means for mounting a body strip and means for mounting a surface strip in engagement therewith for intermittent movement along said axis to be worked by said punch and die means for forming said electrical spring contacts;

first and second electrodes for welding said surface strip to said body strip;

means positioning said first electrode along said axis and spaced from said punch and die means to engage the underside of body strip and fixedly connecting the first electrode on said die bolster and including a conductor to carry current for the first electrode and duct means for circulating cooling fluid; an elongated, narrow arm extending between said bolsters in a direction transverse said axis and mounting said second electrode above the first electrode, the arm being a conductor to carry current for the second electrode and having duct means for circulating cooling fluid;

mounting means connecting said arm to the die bolster and mounting the arm for limited reciprocating motion for moving the second electrode toward and away from the first electrode;

an elongated, narrow leaf spring extending between the bolsters above said arm and in a direction transverse said axis, the spring having abutment means and one end of the spring having a lip;

first mechanism connected to said punch pad bolster and to said leaf spring and fixedly connecting the opposite end of the leaf spring to said punch pad bolster;

second mechanism connected to the punch pad bolster and including a flange engaging the underside of said lip, the engagement permitting the lip and flange to move relatively away from one another generally in the direction of movement of said punch pad bolster and the flange being positioned so that when it is engaged with the lip it maintains the lip with respect to the fixed end of the spring so that the spring is preloaded;

said first and second mechanisms providing for the leaf spring and its abutment means to reciprocate with the punch pad bolster;

said abutment means being positioned to move said arm and second electrode toward the first electrode with movement of the punch pad bolster in the working stroke whereby the second electrode engages the top of said surface strip and under such condition said engagement of the lip and flange providing for the flange to continue down with the punch pad bolster in the working stroke so the lip and flange move apart whereby to permit the spring to develop force to press the strips between the electrodes and maintain the engagement thereof for the welding operation;

said means mounting said arm being operative, when the punch pad bolster is in the return position, to yieldably maintain the arm in a position wherein said second electrode is spaced away from said first electrode; and said engagement of the second electrode with the surface strip occurring simultaneously with the operation of said punch and die means so there is simultaneous occurrence of the welding and the stamping of the punch and die means.

4. In a progressive die for making electrical spring contacts;

a punch pad bolster mounting a punch pad having a plurality of punch means and die bolster mounting a die pad having a plurality of die means respectively spaced at stations along an axis, the punch pad bolster being mounted to move in a working stroke from a return position toward the die bolster and in a return stroke away from the die bolster to the return position;

means for mounting a body strip and means for mounting a surface strip in engagement therewith for movement between said bolsters to be worked by said punch and die means for forming said electrical spring contacts;

first and second electrodes for welding the surface strip to the body strip;

means fixedly mounting said first electrode on said die bolster along said axis to engage the underside of said body strip;

movable mechanism on said die bolster and mounting said second electrode between said bolsters above the first electrode for limited reciprocating movement toward and away from the first electrode;

means mounted on said punch pad bolster for reciprocating movement therewith and disposed so that when the punch pad bolster moves in the working stroke last said means moves said movable mechanism whereby to move said second electrode into engagement with said surface strip to thereby cause the welding of the surface strip to the body strip to occur simultaneously with the stamping of said punch and die means; and said movable mechanism having means operative when the punch pad bolster is in the return position to yieldably maintain the movable mechanism in a position wherein said second electrode is spaced away from said first electrode.

5. In a progressive die having a fixed die bolster and a reciprocating punch pad bolster for making electrical spring contacts by moving a body strip and a surface strip engaged therewith along an axis and working the same with punch and die means respectively mounted on the bolsters and the punch pad bolster being mounted to move in a working stroke from a return position toward the die bolster and in a return stroke away from die bolster to the return position, welding mechanism operable simultaneously with the operation of the punch and die means for welding the surface strip to the body strip comprising:

first and second welding electrodes:

means positioning said first electrode along said axis to engage the underside of said body strip and fixedly mounting the first electrode on the die bolster and including a conductor to carry current for the first electrode and duct means for circulating cooling fluid;

an elongated, narrow arm extending between the bolsters in a direction transverse said axis and mounting said second electrode above said first electrode, the arm being a conductor to carry current for the second electrode and having duct means for circulating cooling fluid;

mounting means connecting the said arm to the die bolster and mounting the arm for limited reciprocating motion whereby to move the second electrode toward and away from the first electrode; an elongated, narrow, leaf extending between the bolsters above said arm and in a direction transverse said axis, the spring having abutment means and one end of the spring having a lip;

first mechanism connected to said punch pad bolster and to said leaf spring and fixedly connecting the opposite end of the spring to the punch pad bolster;

second mechanism connected to the punch pad bolster including a flange engaging the underside of said lip, the engagement permitting the lip and flange to move relatively away from one another generally in the direction of movement of said punch pad bolster and the flange being positioned so that when it is engaged with the lip it maintains the lip with respect to the fixed end of the spring so that the spring is pre-loaded;

said first and second mechanisms providing for the leaf spring and its abutment means to reciprocate with the punch pad bolster;

said abutment means being positioned to move said arm and second electrode toward and first electrode with movement of the punch pad bolster in the working stroke whereby the second electrode engages the top of said surface strip and under such condition said engagement of the lip and flange providing for the flange to continue down with the punch pad bolster in the working stroke so the lip and flange move apart whereby to permit the spring to develop force to press the strips between the electrodes and maintain the engagement thereof for the welding operation; and said means mounting said arm being operative, when the punch pad bolster is in the return position, to yieldably maintain the arm in a position wherein said second electrode is spaced away from said first electrode.

6. In a progressive die having a fixed die bolster and a reciprocating punch pad bolster for making electrical spring contacts by moving a body strip and a surface strip engaged therewith along an axis and working the same with punch and die means respectively mounted on the bolsters and the punch pad bolster being mounted to move in a working stroke from a return position toward the die bolster and in a return stroke away from die bolster to the return position, welding mechanism operable simultaneously with the operation of the punch and die means for welding the surface strip to the body strip comprising:

first and second welding electrodes;

means positioning said first electrode along said axis to engage the underside of said body strip and fixedly mounting the first electrode on the die bolster;

an elongated, narrow arm extending between the bolsters in a direction transverse said axis and mounting said second electrode above said first electrode;

mounting means connecting the said arm to the die bolster and mounting the arm for limited reciprocating motion whereby to move the second electrode toward and away from the first electrode;

spring means including abutment means; first mechanism connected to said punch pad bolster and to said spring means and fixedly engaging one end of the spring means with the punch pad bolster;

second mechanism fixedly connected to the punch pad bolster including flange means engaging the underside of the opposite end of the spring means, the engagement permitting the opposite end to move relatively away from the flange means generally in the direction of movement of said punch pad bolster and the flange means being positioned so that when it is engaged with the opposite end it maintains the opposite end with respect to the fixed end so that the spring is pre-loaded;

said first and second mechanisms providing for the spring means and abutment means to reciprocate with the punch pad bolster;

said abutment means being positioned to move said arm and second electrode toward the first electrode with movement of the punch pad bolster in the working stroke whereby the second electrode engages the top of said surface strip and under such condition said engagement of said opposite end and said flange means providing for the flange means to continue down with the punch pad bolster in the working stroke so the opposite end and flange means move apart whereby to permit the spring to develop force to press the strips between the electrodes and maintain engagement thereof for the welding operation; and said mounting means for said arm being operative when said punch pad bolster is in the return position to yieldably maintain the arm in a position wherein said second electrode is spaced from said first electrode.

7. In a progressive die having a fixed die bolster and a reciprocating punch pad bolster for making electrical spring contacts by moving a body strip and a surface strip engaged therewith along an axis and working the same with punch and die means respectively mounted on the bolsters and the punch pad bolster being mounted to move in a working stroke from a return position toward the die bolster and in a return stroke away from die bolster to the return position, welding mechanism operable simultaneously with the operation of the punch and die means for welding the surface strip to the body strip comprising:

first and second welding electrodes:

means positioning said first electrode along said axis to engage the underside of said body strip and fixedly mounting the first electrode on the die bolster;

an elongated, narrow arm extending between the bolsters in a direction transverse said axis and mounting said second electrode above said first electrode;

mounting means connecting the said arm to the die bolster and mounting the arm for limited reciprocating motion whereby to move the second electrode toward and away from the first electrode;

spring means having a fixed portion and a movable portion;

mechanism fixedly connecting said fixed portion to said punch pad bolster whereby said spring means partakes of the reciprocating motion of the bolster and said movable portion being mounted to be yieldable generally in the direction of movement of the punch pad bolster;

abutment means connected to said movable portion of said spring means;

said abutment means being positioned to move said arm and second electrode toward the first electrode with movement of the punch pad bolster in the working stroke whereby said second electrode engages the top of said surface strip and under such condition said movable portion yields while the fixed portion continues down with the punch pad bolster in the working stroke and the spring develops force to press the strips between the electrodes and maintain the engagement thereof for the welding operation; and said mounting means for said arm being operative, when said punch pad bolster is in the return position, to yieldably maintain the arm in a position wherein said second electrode is spaced from said first electrode.

* * * * *